C. F. QUINCY.
INSULATED RAIL JOINT.
APPLICATION FILED MAR. 16, 1908.
972,471.
Patented Oct. 11, 1910.
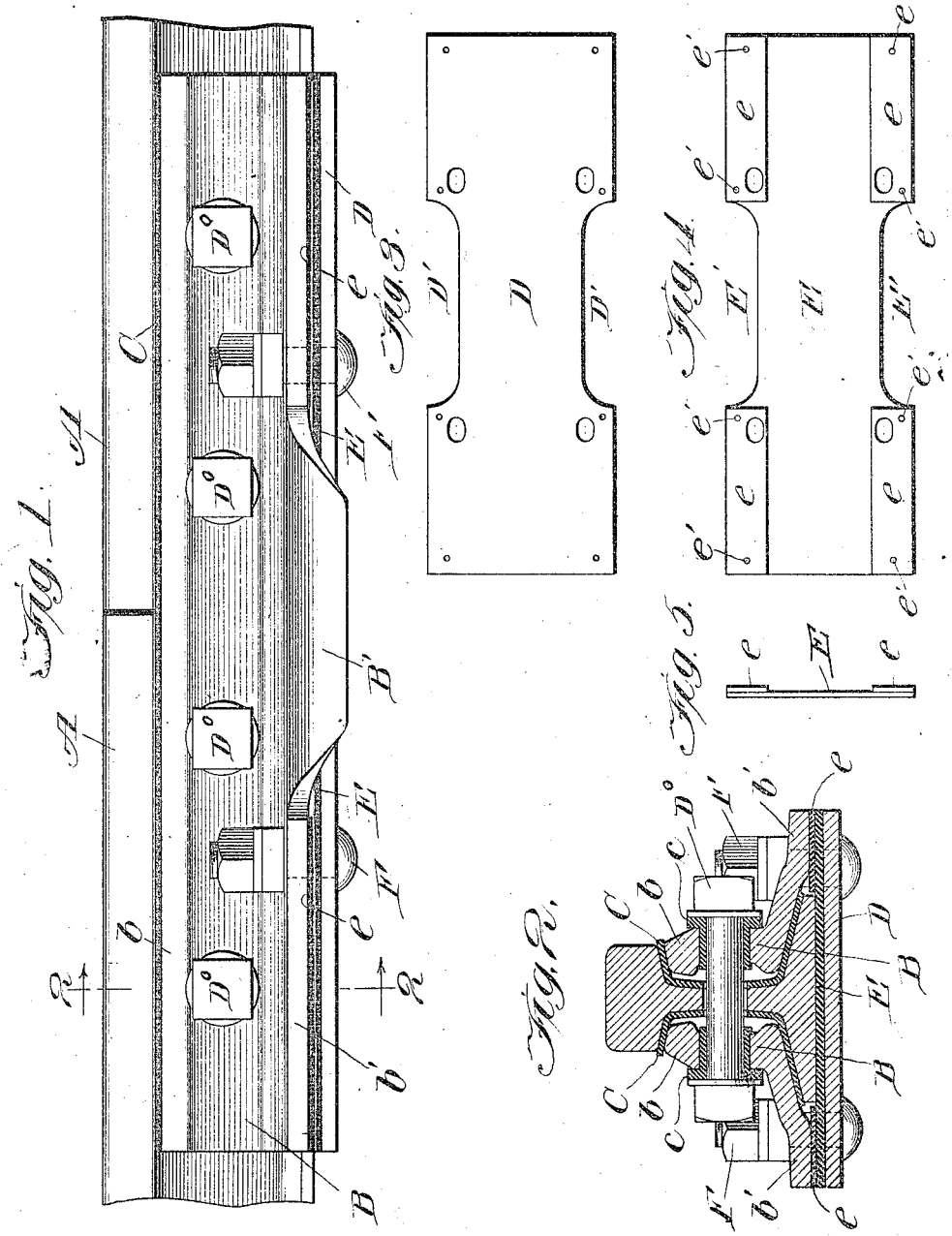
Witnesses:
Harry S. Gaither
Ruby V. Nash
Inventor:
Charles F. Quincy
by Walter H. Chamberlin
his atty

UNITED STATES PATENT OFFICE.

CHARLES F. QUINCY, OF OCONOMOWOC, WISCONSIN, ASSIGNOR TO QUINCY, MANCHESTER, SARGENT COMPANY, OF NEW YORK, N. Y., A CORPORATION OF NEW JERSEY.

INSULATED RAIL-JOINT.

972,471.   Specification of Letters Patent.   Patented Oct. 11, 1910.

Application filed March 16, 1908. Serial No. 421,525.

*To all whom it may concern:*

Be it known that I, CHARLES F. QUINCY, a citizen of the United States, residing at Oconomowoc, county of Waukesha, State of Wisconsin, have invented a certain new and useful Improvement in Insulated Rail-Joints, and declare the following to be a full, clear, and exact description of the same, such as will enable others skilled in the art to which it pertains to make and use the same, reference being had to the accompanying drawings, which form a part of this specification.

My invention relates to joints for railway rails, particularly those in which the two rail ends are to be electrically insulated from each other and it has for its object to improve the construction of the same.

The various features of novelty which characterize my invention will be hereinafter pointed out with particularity in the claim, but for a full understanding of my invention and of its object and advantages reference is to be had to the following detailed description taken in connection with the accompanying drawing wherein:

Figure 1 is a side elevation of a joint arranged in accordance with a preferred embodiment of my invention; Fig. 2 is a section on line 2—2 of Fig. 1; Fig. 3 is a plan view on a smaller scale showing the base plate; Fig. 4 is a view similar to Fig. 3 showing the insulating member between the base plate and the rail; and Fig. 5 is an end view of the insulating member.

Referring to the drawing, A and A' represent two rail ends.

B, B are two fish plates each having a vertical member $b$ fitting between the head and the base of each of the rails and a laterally projecting flange $b'$ bearing upon the top of the base of the rail and extending laterally beyond the base. The lower faces of the flanges $b'$, $b'$, lie above the plane of the undersurface of the rail base.

C, C indicate layers of insulating material arranged between the fish plates and the rail so as to prevent metallic contact between the same.

$D^o$, $D^o$ are bolts passing through the fish plates and the webs of the rails so as to tie the parts rigidly together. The bolts are preferably insulated from the fish plates as by means of bushings $c$, $c$.

D is a flat base plate equal in length to the fish plates and preferably of such a width that its side edges lie directly beneath the outer edges of the flanges $b'$.

E is a slab of insulating material preferably of the same shape as the base plate, lying between the base plate and the bottom of the rail so as to insulate the base plate from the rail. In order to avoid leaving a space beneath the flanges of the fish plates and thereby decreasing the rigidity of the support, I thicken the member E along the sides thereof so that when the parts are assembled the flanges of the fish plates are borne directly from the base plate through the insulating member. The flanges of the fish plates, the insulating member E, and the base plate are all tied together into one solid structure by means of bolts F, F.

Where the insulating member E is made of a board or sheet of fiber I prefer to effect the thickening at the edges by means of fiber strips $e$, $e$, which are secured to the upper surface of the main member, preferably by means of rivets $e'$. These rivets need not be employed but they are convenient since it is unnecessary to insulate the flanges of the fish plates from the base plate and it is therefore immaterial whether or not the rivets make metallic contact with both the fish plates and the base plate.

It is sometimes desirable to provide an auxiliary stiffening directly at the joint between the two rails and where such is the case a downwardly depending chord B' may be formed at the middle of each of the fish plates. The sides of the base plate and of the insulating member are then cut away at opposite sides as at D' and E', respectively, so as to provide for the reception of the downwardly depending chords. In this case, also, the strips of insulating material do not run throughout the entire length of the main insulating member, but only short pieces are employed at each corner.

It will now be seen that I have provided an insulated joint which is extremely simple in construction and in which absolute rigidity is obtained since there is a solid bearing between the several parts at every point.

Having now fully described my invention, what I claim as new and desire to secure by Letters Patent is:

In an insulated rail joint, the combination of two adjacent rail ends, fish plates arranged between the heads and the bases of the rails and having laterally extending flanges projecting beyond the sides of the rail bases in a plane above the underside of the bases, each of said fish plates having a downwardly projecting chord at the center thereof, a layer of insulation between each fish plate and the rails, a flat base plate located beneath the bases of the rails and projecting laterally beneath the flanges on the fish plates, said base plate having portions removed from opposite sides thereof to receive the downwardly projecting chords on the fish plates, a slab of insulating material arranged between said base plate and the bases of the rails and conforming in shape to the shape of the base plate, said slab being thickened at each of its corners so as to fit snugly between the flanges of the fish plates and the base plate, bolts passing through the fish plates and the webs of the rails, and bolts for tying the flanges of the fish plates, the insulating slab and the base plate into one solid structure.

In testimony whereof, I, sign this specification in the presence of two witnesses.

CHARLES F. QUINCY.

Witnesses:
C. C. KISTER,
W. W. HIRT.